(12) United States Patent
Baker et al.

(10) Patent No.: US 9,476,358 B2
(45) Date of Patent: Oct. 25, 2016

(54) PARALLEL METERING PRESSURE REGULATION SYSTEM FOR A THERMAL EFFICIENT METERING SYSTEM

(71) Applicants: Carthel C. Baker, Oregon, IL (US); Michael P. Garry, Rockford, IL (US)

(72) Inventors: Carthel C. Baker, Oregon, IL (US); Michael P. Garry, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 381 days.

(21) Appl. No.: 13/946,063

(22) Filed: Jul. 19, 2013

(65) Prior Publication Data

US 2015/0020888 A1    Jan. 22, 2015

(51) Int. Cl.
  G05D 11/00    (2006.01)
  F02C 7/236    (2006.01)
  F02C 9/26     (2006.01)
  G05D 7/06     (2006.01)

(52) U.S. Cl.
  CPC ............. *F02C 7/236* (2013.01); *F02C 9/263* (2013.01); *G05D 7/0664* (2013.01); *F05D 2270/3015* (2013.01); *Y10T 137/0379* (2015.04); *Y10T 137/2521* (2015.04); *Y10T 137/86002* (2015.04)

(58) Field of Classification Search
  CPC .................. Y10T 137/2521; Y10T 137/2514; Y10T 137/2529; Y10T 137/2605
  See application file for complete search history.

(56) References Cited

U.S. PATENT DOCUMENTS

| | | | |
|---|---|---|---|
| 5,845,484 A | 12/1998 | Maker | |
| 6,095,793 A | 8/2000 | Greeb | |
| 7,431,015 B2 * | 10/2008 | Mahoney et al. | 123/434 |
| 2003/0192300 A1 | 10/2003 | Mahoney et al. | |
| 2004/0011052 A1 | 1/2004 | Clements | |
| 2010/0089025 A1 * | 4/2010 | Baker | 60/39.281 |
| 2010/0122535 A1 | 5/2010 | Finkbeiner | |
| 2011/0162724 A1 | 7/2011 | Kleckler | |
| 2012/0045348 A1 | 2/2012 | Garry | |
| 2014/0196459 A1 * | 7/2014 | Futa | F02C 7/236 60/734 |
| 2015/0020889 A1 * | 1/2015 | Baker | 137/12 |

OTHER PUBLICATIONS

U.S. Appl. No. 13/946,096, filed Jul. 19, 2013, Baker.

* cited by examiner

*Primary Examiner* — R. K. Arundale
(74) *Attorney, Agent, or Firm* — Reinhart Boerner Van Deuren P.C.

(57) ABSTRACT

A fuel pressure regulation system is provided. The fuel pressure regulation system includes a supply arrangement for supplying an outlet flow. A primary metering circuit is provided, an inlet of which receives a first portion of the outlet flow of the supply arrangement, the primary metering circuit comprising a fuel metering valve and a primary pressure regulator. The primary pressure regulator is connected to an outlet of the fuel metering valve. The system also includes at least one secondary metering circuit. The primary pressure regulator is operably connected to the at least one secondary metering circuit to sense a pressure of the at least one secondary metering circuit. The system also includes a bypass regulator connected in parallel with the primary metering circuit and the least one secondary metering circuit such that an inlet of the bypass regulator receives a second portion of the outlet flow of the supply arrangement.

20 Claims, 4 Drawing Sheets

PARALLEL METERING PRESSURE REGULATION SYSTEM FOR A THERMAL EFFICIENT METERING SYSTEM

FIELD OF THE INVENTION

This invention generally relates to fuel flow systems, and more particularly to parallel metering fuel flow systems in combustion engine applications.

BACKGROUND OF THE INVENTION

Parallel metering systems have been used in many industrial turbine applications. These systems provide accurate fuel placement to multiple combustor locations via multiple metered flow paths arranged in parallel. In such systems, flow is initially provided by one or more pumps. This initial flow is then divided across the multiple metered flow paths arranged in parallel to distribute the same to multiple combustor locations.

As commercial aircraft combustion systems become more complex in order to provide improved fuel efficiency and reduced emissions, the flexibility of a parallel metering system may offer significant benefits. Positive displacement pumps are often preferred for turbine engines due to their good efficiency and high reliability. Parallel metering systems used in industrial turbine engine applications typically include a pressure regulated positive displacement pump that supplies flow to the multiple metered flow paths arranged in parallel. The pump pressure regulation system typically maintains the pump discharge pressure at a constant pressure that is high enough to meet the pressure needs of the metered flow paths for all operating conditions.

Unfortunately, this discharge pressure may be significantly higher than the requirements of the metered flow path. Operating the pump at pressures higher than required leads to undesirable additional pump heat input to the fuel system. Thermal efficient fuel pumping is typically required to meet the aircraft engine operational requirements. Maintaining the positive displacement pump at high pressure for all operating conditions is likely not acceptable for most aircraft engine applications.

Some proposed parallel metering systems for aircraft engines consider controlling the pump discharge pressure to attempt to more closely match the system pressure needs by estimating the required pressure and then using an electrically driven pressure regulator to set the desired pressure. These systems require that the estimated pressure include all system variation and life impacts; this stack up can lead to higher than desired system pressure.

Accordingly, there is a need in the art for a parallel metering system that does not require substantially oversizing the pump and its attendant discharge pressure in an effort to accommodate various systemic pressure demands.

The invention provides such a parallel metering system. These and other advantages of the invention, as well as additional inventive features, will be apparent from the description of the invention provided herein.

BRIEF SUMMARY OF THE INVENTION

Embodiments of the parallel metering system described herein regulate discharge pressure of a positive displacement pump to the minimum pressure or slightly higher than the minimum pressure required to supply a parallel metering system. This is accomplished with the primary pressure regulator that maintains the pressure downstream of primary metering circuit at a higher pressure than the downstream pressure of the other metering circuits in the parallel metering system. Maintaining the pressure downstream of primary metering circuit at a higher pressure allows a bypassing metering system to be used to regulate the differential pressure across the primary metering system. The bypass pressure regulator in the primary metering system regulates pressure upstream of the metering circuit to maintain a nearly constant differential pressure across the metering circuit. The combination of the primary pressure regulator and the bypass pressure regulator act to regulate pump discharge pressure at a sufficient level to support the metering system.

The secondary metering circuits each include a throttling pressure regulation system to regulate the differential pressure across the metering system at the desired nearly constant differential pressure. Maintaining the pressure downstream of primary metering circuit at a higher pressure than the downstream pressure of the secondary metering circuits and regulating the pressure upstream of the metering circuits at a nearly constant value above the downstream pressure ensures that there is sufficient pressure across the secondary metering circuits.

In one aspect, a fuel pressure regulation system is provided. The fuel pressure regulation system includes a supply arrangement for supplying an outlet flow. The system also includes a primary metering circuit, an inlet of which receives a first portion of the outlet flow of the supply arrangement, the primary metering circuit comprising a fuel metering valve and a primary pressure regulator. The primary pressure regulator is connected to an outlet of the fuel metering valve. The system also includes at least one secondary metering circuit. The primary pressure regulator is operably connected to the at least one secondary metering circuit to sense a pressure of the at least one secondary metering circuit. The system also includes a bypass regulator connected in parallel with the primary metering circuit and the least one secondary metering circuit such that an inlet of the bypass regulator receives a second portion of the outlet flow of the supply arrangement. The bypass regulator is operably connected on an outlet side of the fuel metering valve to sense a pressure in the primary metering circuit downstream from the fuel metering valve.

In certain embodiments, the bypass regulator is operable to adjust a bypass flow of fuel which is returned to an inlet side of the supply arrangement based upon the sensed downstream pressure of the primary metering circuit. The bypass regulator is configured to adjust the bypass flow of fuel to maintain a substantially constant pressure differential across the fuel metering valve of the primary metering circuit.

In certain embodiments, the primary pressure regulator has a regulated pressure value, and the primary pressure regulator adjusts an inlet side pressure of the primary pressure regulator to be at least as high as the highest of a pressure of the primary metering circuit downstream from the primary pressure regulator or the sensed pressure of the at least one secondary metering circuit plus the regulated pressure value.

In certain embodiments, the primary pressure regulator is a proportional control device. In certain other embodiments, the primary pressure regulator is an integral control device. In certain other embodiments, the primary pressure regulator is an integral plus proportional control device.

In certain embodiments, the primary metering circuit further comprises a throttling valve connected downstream from the fuel metering valve and upstream from the primary pressure regulator, wherein the bypass regulator senses the pressure in the primary metering circuit downstream from the fuel metering valve and downstream from the throttling valve.

In certain embodiments, the supply arrangement includes first and second pumps and a pump switching system for at least one of selectively switching between outputs of the first and second pumps and/or combining the outputs of the first and second pumps to provide the output flow of the supply arrangement.

In certain embodiments, the primary metering circuit includes a head regulator operably arranged to sense a pressure of the first portion of the outlet flow from the supply arrangement and a pressure on an outlet side of the fuel metering valve, and wherein the bypass regulator is operably connected to the head regulator to sense the pressure in the primary metering circuit downstream from the fuel metering valve.

In another aspect, a fuel pressure regulation system is provided. The system includes a supply arrangement for supplying an outlet flow. The system also includes a primary metering circuit, an inlet of which receives a first portion of the outlet flow of the supply arrangement. The primary metering circuit includes a fuel metering valve and a primary pressure regulator. The primary pressure regulator is connected to an outlet of the fuel metering valve. The system also includes a bypass regulator connected in parallel with the primary metering circuit such that an inlet of the bypass regulator receives a second portion of the outlet flow of the supply arrangement. The system also includes at least one secondary metering circuit, an inlet of which receives a third portion of the outlet flow of the supply arrangement. The at least one secondary metering circuit is connected in parallel with the primary metering circuit and the bypass regulator. The primary pressure regulator senses a downstream pressure of the primary metering circuit and a downstream pressure of the at least one secondary metering circuit and is operable to adjust an inlet side pressure of the primary pressure regulator to be at least as high as the highest of the downstream pressure of the primary metering circuit or the downstream pressure of the at least one secondary metering circuit plus a regulated pressure value of the primary pressure regulator.

In certain embodiments, the at least one secondary metering circuit includes a plurality of secondary metering circuits, each of which are connected in parallel to one another and in parallel to the bypass regulator and primary metering circuit.

In certain embodiments, the primary pressure regulator senses a downstream pressure of each of the plurality of secondary metering circuits and is operable to adjust an inlet side pressure of the primary pressure regulator to be at least as high as the highest of the downstream pressure of the primary metering circuit or a highest one the downstream pressures of the plurality of secondary metering circuits plus a regulated pressure value of the primary pressure regulator, and wherein the bypass regulator is operably connected to the primary metering circuit to detect the inlet side pressure of the primary pressure regulator.

In certain embodiments, each of the plurality of secondary metering circuits comprises a fuel metering valve and a throttling valve connected to an outlet of the fuel metering valve.

In certain embodiments, the bypass regulator is operable to adjust a bypass portion of the outlet flow from the supply arrangement based upon the pressure sensed at the inlet side of the primary pressure regulator.

In yet another aspect, a method for maintaining a minimum operational pressure differential across a fuel metering valve of a primary metering circuit of a fuel pressure regulation system is provided. The method includes sensing, with a primary pressure regulator of the primary metering circuit, a downstream pressure of the primary metering circuit and at least one secondary metering circuit connected in parallel to the primary metering circuit. The method also includes adjusting an inlet side pressure of the primary pressure regulator to be at least as high as the highest of the downstream pressure of the primary metering circuit or the downstream pressure of the at least on secondary metering circuit plus a regulated pressure value of the primary pressure regulator. The method also includes adjusting, with a bypass regulator operable connected in parallel with an inlet side of each of the primary metering circuit and at least one secondary metering circuit, an amount of fuel flow bypassed back to an inlet side of a supply arrangement providing an outlet flow of fuel to each of the primary metering circuit, at least one secondary metering circuit, and bypass regulator based upon a pressure sensed at the primary metering circuit.

In certain embodiments, the method also includes maintaining a minimum operational pressure differential across a fuel metering valve of the at least one secondary metering circuit using a throttling valve, wherein the primary pressure regulator senses the downstream pressure of the at least one secondary metering circuit downstream from the throttling valve. The step of maintaining the minimum operational pressure differential across the fuel metering valve of the at least one secondary metering circuit includes regulating a supply pressure of the supply arrangement using a head regulator of the at least one secondary metering circuit operably connected to the throttling valve of the at least one secondary metering circuit.

In certain embodiments, the step of adjusting the amount of fuel flow bypassed back to the inlet side of the supply arrangement with the bypass regulator includes sensing the inlet side pressure of the primary pressure regulator.

In certain embodiments, the step of adjusting the amount of fuel flow bypassed back to the inlet side of the supply arrangement with the bypass regulator includes sensing a reference pressure provided by a head regulator of the primary metering circuit. The head regulator is operably connected to the supply arrangement to detect a pressure thereof and operably connected to the inlet side of the primary pressure regulator to detect the inlet side pressure thereof. The reference pressure is a function of the pressure of the supply arrangement and of the inlet side pressure of the primary pressure regulator.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
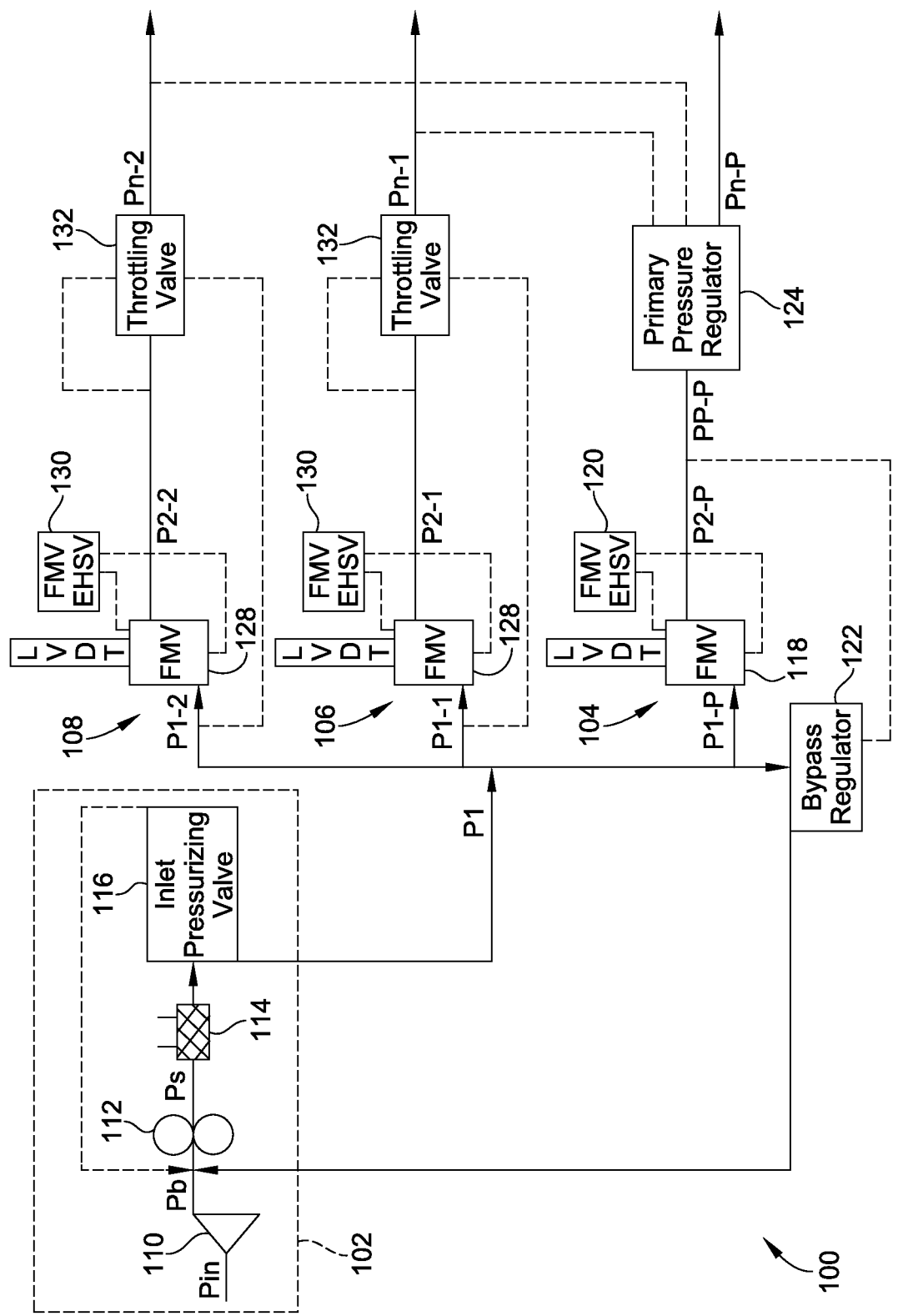
FIG. 1 is a schematic diagram of a first embodiment of a parallel metering pressure regulation system according to the teachings of the present invention.

Turning now to the drawings, FIG. 1 shows one embodiment of the parallel metering regulation system 100. In this embodiment, a supply arrangement 102 supplies a flow of fuel at an output pressure P1 to a primary metering circuit 104 and first and second secondary metering circuits 106, 108. As can be seen from inspection of FIG. 1, primary metering circuit 104 and first and second secondary metering circuits 106, 108 are arranged in parallel such that the output flow of fuel from supply arrangement 102 at pressure P1 is distributed across circuits 104, 106, 108 at pressures P1-P, P1-1, and P1-2, respectively. Although only first and second secondary metering circuits 106, 108 are illustrated, it will be recognized that fewer or greater secondary metering circuits may be included. Indeed, those skilled in the art will recognize that primary metering circuit 104 may be arranged in parallel with any number of additional circuits.

Supply arrangement 102 includes a boost pump 110, a positive displacement pump 112, an actuation supply 114, and an inlet pressurizing valve 116. Inlet pressurizing valve 116 is responsible for supplying the flow output of supply arrangement at pressure P1, and as such, may take the form various pressurizing valves and also may be omitted entirely. Actuation supply 114 utilizes a portion of the output of positive displacement pump 114 for actuator control, the particulars of which are not limiting on the system herein.

Primary metering circuit 104 includes a fuel metering valve (FMV) 118, a FMV electro-hydraulic servo valve (EHSV) 120, and a primary pressure regulator (PPR) 124. A bypass regulator (BPR) 122 is arranged in parallel with circuits 104, 106, 108 at an inlet side thereof. As can be seen at FIG. 1, FMV 118 receives a flow of fuel at an input pressure P1-P, and provides an output flow of fuel at pressure P2-P. BPR 122 is operably connected to the output side of FMV 118 to monitor P2-P, as explained in greater detail below. BPR 122 is also operably connected on the output side of supply arrangement 102 to bypass a portion of the flow back to the input side of supply arrangement 102.

Each of the two secondary metering circuits 106, 108 includes a FMV 128, an EHSV 130, and a throttling valve (THV) 132. As can be seen at FIG. 1, first and second secondary metering circuits 106, 108 are similar, and as such, like reference characters are used in both branches for purposes of simplicity. Due to their differing end uses in the combustion engine, however, first and second secondary metering circuits 106, 108 may perform differently and/or be sized differently.

PPR 124 (which may be a proportional, integral, or integral plus proportional control type device) senses the pressure downstream Pn-P, Pn-1, Pn-2 of each of the three metering circuits 104, 106, 108. Indeed, PPR 124 inherently has a regulated pressure value. In other words, PPR 124 inherently requires a minimum pressure in primary metering circuit 104 to overcome the regulated pressure value of PPR 124 to hold PPR 124 in an open position relative to primary metering circuit 104. However, PPR 124 is also connected to secondary metering circuits 106, 108 such that it receives pressures Pn-1 and Pn-2. As a result, to maintain PPR 124 in an open position, the pressure in primary metering circuit 104 at PPR 124 must be greater than the regulated pressure value plus pressure Pn-1, or greater than the regulated pressure value plus pressure Pn-2. One example of such a configuration may be a proportional valve biased to a closed condition by its internal spring to close primary metering circuit 104. Along with this spring force, the pressure Pn-1 from secondary metering path 106 may also bias this valve closed. As such, the effective pressure at PPR 124 is this pressure Pn-1, plus the pressure derived from the internal spring force. A duplicate configuration would also be used for secondary metering path 108. As either of these sums approach pressure Pn-P (the pressure in primary metering circuit 104 at PPR 124), PPR 124 will begin to close, and as a result, PP-P will be set to be at least equal to the highest of the above combined pressure values (Pn-1 plus the regulated pressure valve, or Pn-2 plus the regulated pressure value).

The pressure P2-P at the discharge of FMV 118 is approximately equal to the pressure PP-P upstream of PPR 124 absent expected losses. BPR 122 senses P2-P and the pressure P1-P at the inlet of FMV 118. BPR 122 acts to regulate P1-P to a nearly constant value above P2-P by controlling the portion of total pump flow from supply arrangement 102 that is allowed to be bypassed back to the low pressure inlet side of supply arrangement 102. To achieve this control, BPR 122 may be a proportional control type device, however, other types of control implementations are equally plausible, e.g. integral or integral plus proportional control types.

Based upon the parallel configuration of circuits 104, 106, 108, the pressure at P1-P is substantially equal to that of input pressures P1-1, P1-2 of secondary metering circuits 106, 108. Put differently, regulation of P1-P by BPR 122 is also a regulation of P1-1 and P1-2. The advantages of such a configuration are discussed in greater detail below.

THV 132 (which may be a proportional, integral, or integral plus proportional control device) in each secondary metering circuit 106, 108 regulates the differential pressure across its respective FMV 128 to a nearly constant value by acting as a variable restriction in series with the FMV 128. However, THV 132 can only operate when there is an excess of pressure differential across FMV 128 and THV 132. As a result, the pressure differential across FMV 128 and THV 132 must be sufficient enough to accommodate the desired constant pressure differential across FMV 128, as well as the necessary additional pressure differential needed to operate THV 132.

As previously described, PPR 124 maintains pressure PP-P upstream of PPR 124 at least as high as the highest of pressures Pn-P, (Pn-1 plus PPR 124 regulated pressure valve), (Pn-2 plus PPR 124 regulated pressure valve). The discharge pressure P2-P of FMV 118 is approximately equal to pressure PP-P upstream of the PPR 124. BPR 122 maintains pressure P1-P at a desired nearly constant value above P2-P. The supply pressure P1-1, P1-2 to each secondary metering circuit 106, 108 is approximately equal to P1-P.

Because PP-P is regulated by PPR 124 as described above, BPR 122 is effectively monitoring the highest of upstream pressures Pn-1, Pn-2, Pn-P. As a result, any pressure spikes in any one of circuits 104, 106, 108 that might affect the pressure differential across FMV 118, or across secondary metering circuits 106, 108, are accommodated by BPR 122 as explained below.

Indeed, each secondary metering circuits 106, 108 is designed such that the minimum operational pressure differential across it is less than the minimum operational differential pressure across FMV 118 (P1-P)–(P2-P) plus (PP-P)–(Pn-1), or plus (PP-P)–(Pn-2). In the event an increased pressure is detected at any one of Pn-1, Pn-2, Pn-P and reflected at PP-P by PPR 124, BPR 122 detects this increase at PP-P and thereafter increases essentially equally each of P1-P, P1-1, P1-2 to maintain a pressure drop across FMV 118 and/or secondary metering circuits 106, 108 that is equal to or greater than the minimum operational pressure differential across the same.

As a practical example, assume P1-P, P1-1, and P1-2 are each initially at 100 psi. Further, assume each of FMV's 118, 128 require a constant 50 psi pressure differential thereacross. Also assume that PPR 124 has a regulated pressure value of 30 psi, Pn-P is initially at 50 psi, and Pn-1 and Pn-2 are each at 10 psi. In such an instance, PP-P will be equal to Pn-P, as Pn-P is greater than Pn-1 plus 30 psi, and is greater than Pn-2 plus 30 psi. As a result, the desired constant pressure differential across FMV 118 of 50 psi is maintained. Additionally, the pressure differential across FMV 128 and throttling valve 132 in each secondary metering circuit 106, 108 is 90 psi, thereby maintaining the desired constant pressure differential across FMV's 128 and providing an additional pressure differential for the operability of THV's 132.

Now assume an increase in Pn-1 to 30 psi. Pn-1 plus 30 psi (PPR 124 regulated pressure value) is now equal to 60 psi, which is greater than the 50 psi value of Pn-P. PP-P will then approach this higher value. BPR 122 will detect this increase, and subsequently bypass less fuel back to pump 102 to increase each of P1-P, P1-1, P1-2, to maintain the constant 50 psi pressure differential across FMV 118, P1-P, P1-1, and P1-2 will each increase to 110 psi. The total pressure differential across secondary metering circuit is (P1-1)–(Pn-1), i.e. 110 psi–30 psi, which is 80 psi. As a result, the constant 50 psi pressure differential across FMV 128 of secondary metering circuit 106 is maintained, as well as an additional pressure differential for operation of THV 312 of secondary metering circuit 106.

Figure 2:
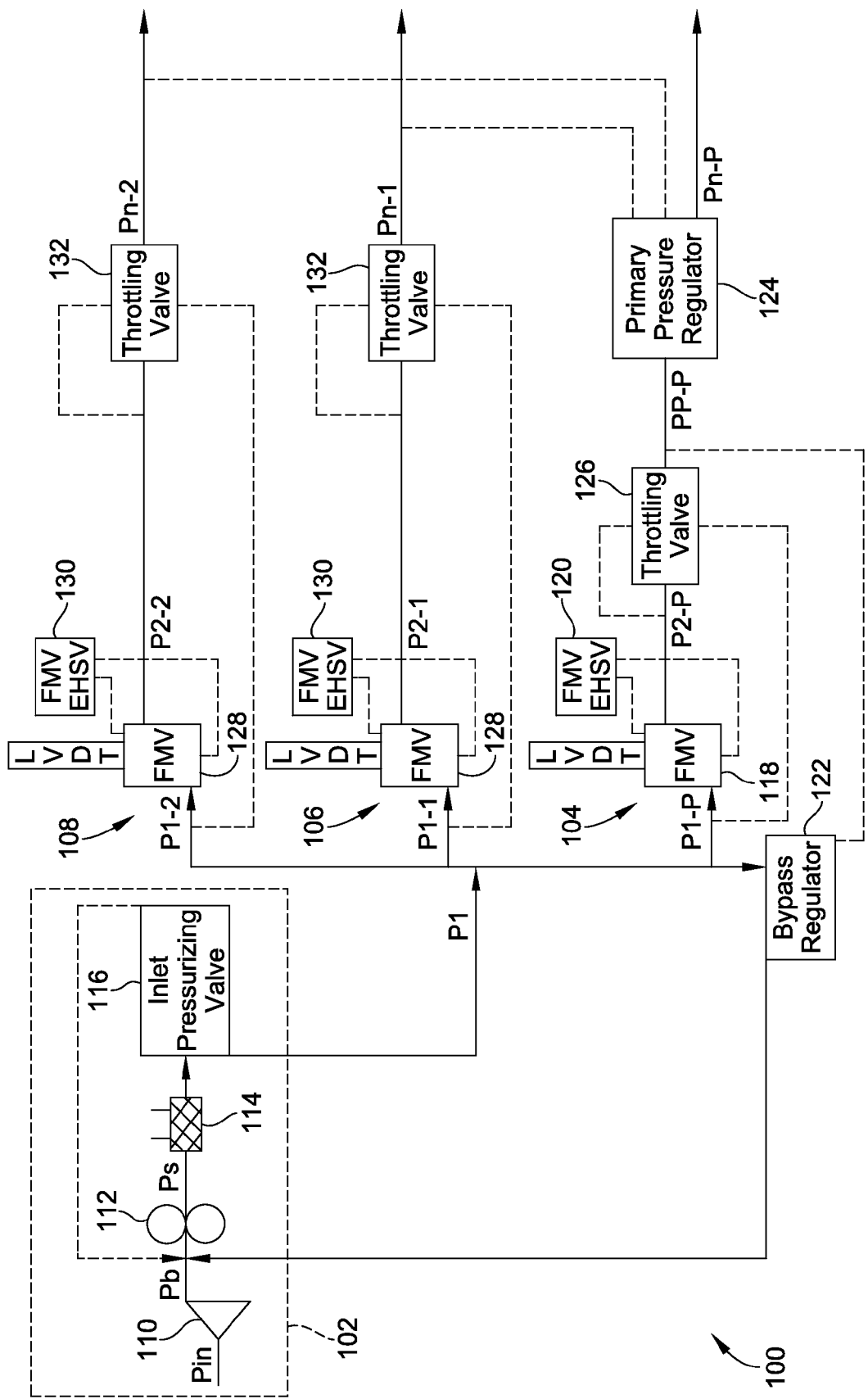
FIG. 2 is a schematic diagram of the embodiment of FIG. 1 including an additional throttling valve.

Turning now to FIG. 2, primary metering circuit 104 may also include a throttling valve (THV) 126. In this configuration, THV 126 is interposed between FMV 118 and PPR 124. THV 126 regulates the differential pressure across FMV 118 to a nearly constant value by acting as a variable restriction in series with FMV 118. The pressure drop across FMV 118 and the throttling valve is approximately equal (P1-P)–(PP-P) differential regulated by the bypass valve. In the same manner as described above relative to FIG. 1, PPR 124 sets PP-P equal to the highest of Pn-P, Pn-1 plus the regulated pressure valve of PPR 124, or Pn-2 plus the regulated pressure valve of PPR 124. BPR 124 senses PP-P and bypasses an appropriate portion of flow back to the inlet side of supply arrangement 102 in order to maintain P1-P (and consequently P1-1, P1-2) at a value sufficient to maintain the minimum operational pressure differential across FMV 118 and throttling valve 126, i.e. (P1-P)–(PP-P).

Figure 3:
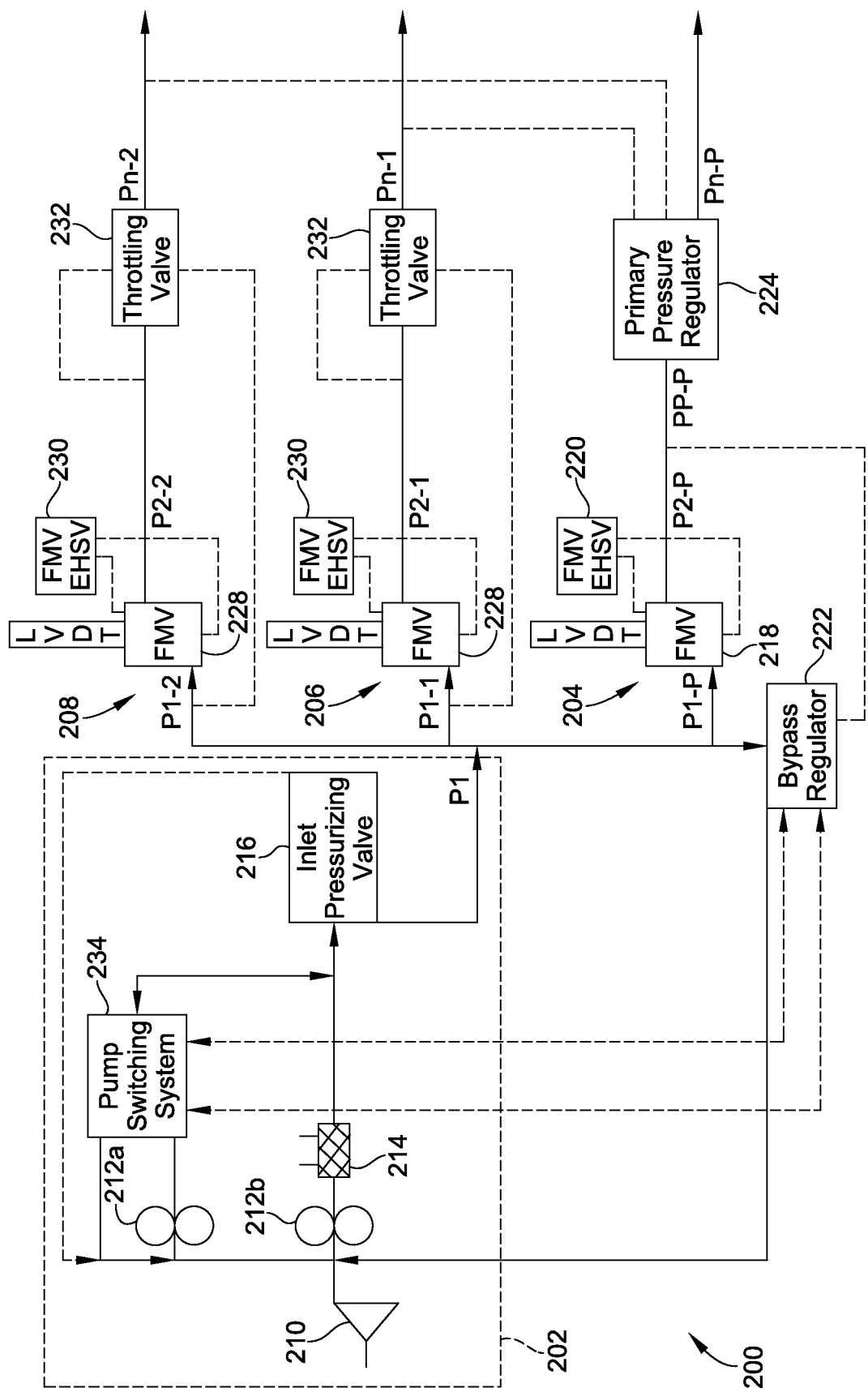
FIG. 3 is a schematic diagram of a third embodiment of a parallel metering pressure regulation system according to the teachings of the present invention.

Turning now to FIG. 3, an alternative embodiment of a parallel metering pressure regulation system 200 is illustrated. This embodiment is similar to the embodiment shown at FIGS. 1 and 2, except that it incorporates a supply arrangement 202 which includes a boost pump 210 and inlet pressurizing valve 216, and that utilizes two positive displacement pumps 212a, 212b and a pump switching system 234 for switching between and/or combining the output flows of the pumps 212a, 212b such as that disclosed in U.S. patent application Ser. Nos. 12/683,685 and 12/860,971 assigned to the instant assignee, the disclosures of which are incorporated by reference herein in their entireties.

As with the embodiment shown in FIGS. 1 and 2, the embodiment shown in FIG. 3 includes a primary metering circuit 204, and first and second secondary metering circuits 206, 208. Primary metering circuit 204 includes FMV 218, EHSV 220, and PPR 224. BPR 222 is arranged in parallel with circuits 204, 206, 208 at an inlet side thereof. Secondary metering circuits 206, 208 each include FMV 228, EHSV 230, and THV 232. Each of BPR 222, PPR 224, and THV 232 may be a proportional, integral, or integral plus proportional control type device. Further, fewer or greater secondary metering circuits may be implemented in parallel with primary metering circuit 204.

In the embodiment of FIG. 3, BPR 222 (which may be a proportional, integral, or integral plus proportional control type device) senses PP-P at primary metering circuit 104. PP-P is set by PPR 224 to be at the highest of Pn-1, Pn-2, Pn-P. BPR 222 is in operable communication with pump switching system 234 to determine the appropriate amount of fuel to bypass back to the inlet side of supply arrangement 204 in order to maintain the desired minimum operational pressure differential across FMV 218, as well as first and second secondary circuits 206, 208. Although not illustrated, primary metering circuit 204 may also include a throttling valve as shown in FIG. 2, such that BPR 222 senses the outlet side pressure of the throttling valve which is downstream from FMV 218.

Additionally, BPR 222 and pump switching system 234 may also be configured such that they operably communicate with one another to govern the particular flow settings provided by pump switching system 234. Indeed, an appropriate outlet side pressure P1 of supply arrangement 204 to maintain the desired minimum operational pressure differential across FMV 218 and secondary circuits 206, 208 may be achieved through a combination of fuel bypass provided by BPR 222, as well as the flow setting of pump switching system 234, i.e. the amount of flow utilized by either and/or both of pumps 212a, 212b.

Figure 4:
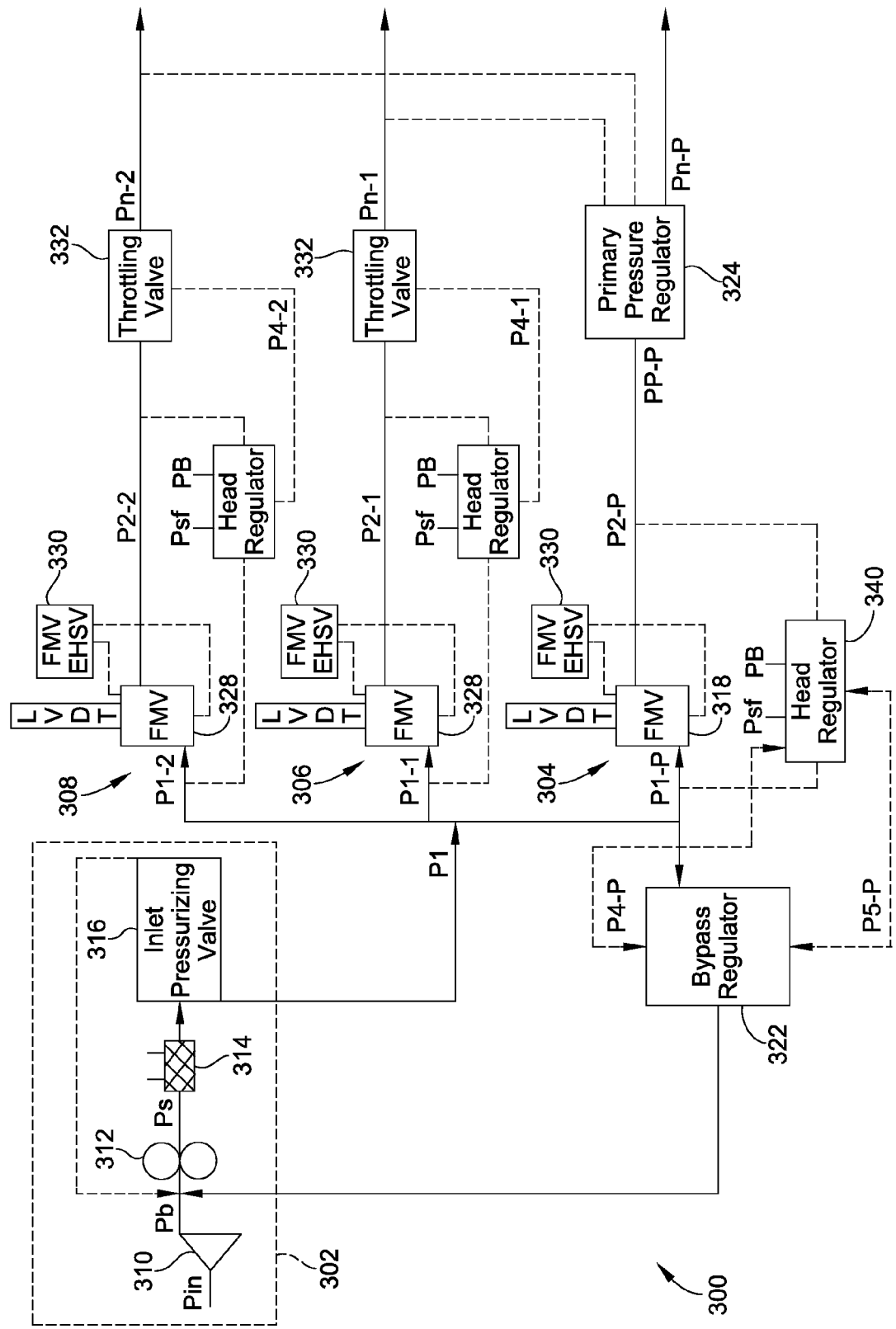
FIG. 4 is a schematic diagram of a fourth embodiment of a parallel metering pressure regulation system according to the teachings of the present invention.

Turning now to FIG. 4, another embodiment of a parallel metering system 300 with the proposed is illustrated. This embodiment is similar to that described above, except this system includes an integrating bypassing system and integrating throttling systems instead of the fully proportional systems shown in FIG. 1.

The embodiment shown in FIG. 4 includes a supply arrangement 302. Supply arrangement 302 includes a boost pump 310, a positive displacement pump 312, an actuation supply 314, and inlet pressurizing valve 316. As was the case above, inlet pressurizing valve 316 may be omitted. Yet further, supply arrangement 302 may incorporate a dual pump configuration with a pump switching system as that described above relative to FIG. 3.

Supply arrangement 302 provides an outlet flow at pressure P1 to a primary metering circuit 304, and first and second secondary metering circuits 306, 308. Primary metering circuit includes FMV 318, EHSV 330, PPR 324, and head regulator 340. BPR 322 is arranged in parallel with circuits 304, 306, 308 at an inlet side thereof. Secondary metering circuits each include FMV 318, EHSV 330, THV 332, and head regulator 350.

In this configuration, instead of positioning BPR 322 directly based on FMV 318 differential pressure (P1-P minus P2-P), FMV 318 differential pressure is sensed across head regulator 340. Based on this sensed pressure, head regulator 340 is positioned to regulate the additional supply (Psf) and drain (Pb) pressures to regulate BPR 322 control pressures (P4-P and P5-P) and position the BPR 322 to control the portion of total pump flow that is allowed to be bypassed back to the low pressure side of supply arrangement 302. The combination of head regulator 340 and BPR 322 act to regulate P1-P to a nearly constant value above P2-P.

Similarly in the secondary metering circuit 306, 308, instead of positioning THV's 332 directly based on the sensed FMV 328 differential pressure ((P1-1)−(P2-1), (P1-2)−(P2-2)), respectively), FMV 328 differential pressure is sensed across the secondary head regulators 350, respectively. Based on the sensed pressure, each secondary head regulator regulates the additional supply (Psf) and drain (Pb) pressures to regulate THV 332 control pressures P4-1, P4-2, respectively to control the position of THV 332 and therefore the restriction created by THV 332. The combination of the head regulator 350 and THV 332 act to regulate P1-1 to a nearly constant value above P2-1, or P1-2 to a nearly constant value above P2-2, respectively.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel pressure regulation system, comprising:
   a supply arrangement for supplying an outlet flow at a first pressure;
   a primary metering circuit, an inlet of which receives a first portion of the outlet flow of the supply arrangement, the primary metering circuit comprising a fuel metering valve and a primary pressure regulator, the primary pressure regulator fluidly connected to an outlet of the fuel metering valve;
   at least one secondary metering circuit, the primary pressure regulator operably connected to the at least one secondary metering circuit to sense a pressure of the at least one secondary metering circuit;
   a bypass regulator connected in parallel with the primary metering circuit and the least one secondary metering circuit such that an inlet of the bypass regulator receives a second portion of the outlet flow of the supply arrangement; and
   wherein the bypass regulator is operably connected on an outlet side of the fuel metering valve to sense a pressure in the primary metering circuit downstream from the fuel metering valve.

2. The fuel pressure regulation system of claim 1, wherein the bypass regulator is operable to adjust a bypass flow of fuel which is returned to an inlet side of the supply arrangement based upon the sensed downstream pressure of the primary metering circuit.

3. The fuel pressure regulation system of claim 2, wherein the bypass regulator is configured to adjust the bypass flow of fuel to maintain a substantially constant pressure differential across the fuel metering valve of the primary metering circuit.

4. The fuel pressure regulation system of claim 1, wherein the primary pressure regulator has a regulated pressure value, and wherein the primary pressure regulator adjusts an inlet side pressure of the primary pressure regulator to be at least as high as the highest of a pressure of the primary metering circuit downstream from the primary pressure regulator and the sensed pressure of the at least one secondary metering circuit plus the regulated pressure value.

5. The fuel pressure regulation system of claim 4, wherein the primary pressure regulator is a proportional control device.

6. The fuel pressure regulation system of claim 4, wherein the primary pressure regulator is an integral control device.

7. The fuel pressure regulation system of claim 6, wherein the primary pressure regulator is an integral plus proportional control device.

8. The fuel pressure regulation system of claim 1, wherein the primary metering circuit further comprises a throttling valve connected downstream from the fuel metering valve and upstream from the primary pressure regulator, wherein the bypass regulator senses the pressure in the primary metering circuit downstream from the fuel metering valve and downstream from the throttling valve.

9. The fuel pressure regulation system of claim 1, wherein the supply arrangement includes first and second pumps and a pump switching system for at least one of selectively switching between outputs of the first and second pumps and/or combining the outputs of the first and second pumps to provide the output flow of the supply arrangement.

10. The fuel pressure regulation system of claim 1, wherein the primary metering circuit includes a head regulator operably arranged to sense a pressure of the first portion of the outlet flow from the supply arrangement and a pressure on an outlet side of the fuel metering valve, and wherein the bypass regulator is operably connected to the head regulator to sense the pressure in the primary metering circuit downstream from the fuel metering valve.

11. A fuel pressure regulation system, comprising:
a supply arrangement for supplying an outlet flow;
a primary metering circuit, an inlet of which receives a first portion of the outlet flow of the supply arrangement, the primary metering circuit comprising a fuel metering valve and a primary pressure regulator, the primary pressure regulator fluidly connected to an outlet of the fuel metering valve;
a bypass regulator connected in parallel with the primary metering circuit such that an inlet of the bypass regulator receives a second portion of the outlet flow of the supply arrangement;
at least one secondary metering circuit, an inlet of which receives a third portion of the outlet flow of the supply arrangement, the at least one secondary metering circuit connected in parallel with the primary metering circuit and the bypass regulator; and
wherein the primary pressure regulator senses a downstream pressure of the primary metering circuit and a downstream pressure of the at least one secondary metering circuit and is operable to adjust an inlet side pressure of the primary pressure regulator to be at least as high as the highest of the downstream pressure of the primary metering circuit or the downstream pressure of the at least one secondary metering circuit plus a regulated pressure value of the primary pressure regulator.

12. The fuel pressure regulation system of claim 11, wherein the at least one secondary metering circuit includes a plurality of secondary metering circuits, each of which are connected in parallel to one another and in parallel to the bypass regulator and primary metering circuit.

13. The fuel pressure regulation system of claim 12, wherein the primary pressure regulator senses a downstream pressure of each of the plurality of secondary metering circuits and is operable to adjust an inlet side pressure of the primary pressure regulator to be at least as high as the highest of the downstream pressure of the primary metering circuit or a highest one the downstream pressures of the plurality of secondary metering circuits plus a regulated pressure value of the primary pressure regulator, and wherein the bypass regulator is operably connected to the primary metering circuit to detect the inlet side pressure of the primary pressure regulator.

14. The fuel pressure regulation system of claim 13, wherein each of the plurality of secondary metering circuits comprises a fuel metering valve and a throttling valve connected to an outlet of the fuel metering valve.

15. The fuel pressure regulation system of claim 14, wherein the bypass regulator is operable to adjust a bypass portion of the outlet flow from the supply arrangement based upon the pressure sensed at the inlet side of the primary pressure regulator.

16. A method for maintaining a minimum operational pressure differential across a fuel metering valve of a primary metering circuit of a fuel pressure regulation system, the method comprising:
sensing, with a primary pressure regulator of the primary metering circuit, a downstream pressure of the primary metering circuit and at least one secondary metering circuit connected in parallel to the primary metering circuit;
adjusting an inlet side pressure of the primary pressure regulator to be at least as high as the highest of the downstream pressure of the primary metering circuit or the downstream pressure of the at least on secondary metering circuit plus a regulated pressure value of the primary pressure regulator; and
adjusting, with a bypass regulator operable connected in parallel with an inlet side of each of the primary metering circuit and at least one secondary metering circuit, an amount of fuel flow bypassed back to an inlet side of a supply arrangement providing an outlet flow of fuel to each of the primary metering circuit, at least one secondary metering circuit, and bypass regulator based upon a pressure sensed at the primary metering circuit.

17. The method of claim 16, further comprising maintaining a minimum operational pressure differential across a fuel metering valve of the at least one secondary metering circuit using a throttling valve, wherein the primary pressure regulator senses the downstream pressure of the at least one secondary metering circuit downstream from the throttling valve.

18. The method of claim 17, wherein the step of maintaining the minimum operational pressure differential across the fuel metering valve of the at least one secondary metering circuit includes regulating a supply pressure of the supply arrangement using a head regulator of the at least one secondary metering circuit operably connected to the throttling valve of the at least one secondary metering circuit.

19. The method of claim 16, wherein the step of adjusting the amount of fuel flow bypassed back to the inlet side of the supply arrangement with the bypass regulator includes sensing the inlet side pressure of the primary pressure regulator.

20. The method of claim 16, wherein the step of adjusting the amount of fuel flow bypassed back to the inlet side of the supply arrangement with the bypass regulator includes sensing a reference pressure provided by a head regulator of the primary metering circuit, the head regulator operable connected to the supply arrangement to detect a pressure thereof and operably connected to the inlet side of the primary pressure regulator to detect the inlet side pressure thereof, wherein the reference pressure is a function of the pressure of the supply arrangement and of the inlet side pressure of the primary pressure regulator.

* * * * *